(12) United States Patent
Gorman et al.

(10) Patent No.: US 9,233,500 B2
(45) Date of Patent: Jan. 12, 2016

(54) METHOD OF CO-EXTRUDING, CO-EXTRUSION DIE, AND EXTRUDED ARTICLES MADE THEREFROM

(75) Inventors: Michael R. Gorman, Lake Elmo, MN (US); John H. Horns, Edina, MN (US); Anthony B. Ferguson, Lake Elmo, MN (US); Thomas J. Rieger, Maplewood, MN (US); Ronald W. Ausen, St. Paul, MN (US); William C. Unruh, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 292 days.

(21) Appl. No.: 13/577,694

(22) PCT Filed: Feb. 4, 2011

(86) PCT No.: PCT/US2011/023684
§ 371 (c)(1),
(2), (4) Date: Aug. 8, 2012

(87) PCT Pub. No.: WO2011/097436
PCT Pub. Date: Aug. 11, 2011

(65) Prior Publication Data
US 2012/0308755 A1    Dec. 6, 2012

Related U.S. Application Data

(60) Provisional application No. 61/302,316, filed on Feb. 8, 2010.

(51) Int. Cl.
*B29C 47/06* (2006.01)
*B29C 47/14* (2006.01)
(Continued)

(52) U.S. Cl.
CPC ............ *B29C 47/14* (2013.01); *B29C 47/0021* (2013.01); *B29C 47/062* (2013.01);
(Continued)

(58) Field of Classification Search
CPC ..... B29C 47/06; B29C 47/062; B29C 47/065; B29C 47/145; B29C 47/128
USPC ................. 425/133.5, 192 R, 376.1, 462, 467
See application file for complete search history.

(56) References Cited

U.S. PATENT DOCUMENTS 3,487,505 A * 1/1970 Chisolm et al. ............ 425/133.5
3,884,606 A    5/1975 Schrenk
(Continued)

FOREIGN PATENT DOCUMENTS

DE    29500803    3/1995
DE    19806452    8/1999
(Continued)

OTHER PUBLICATIONS

International Search Report for PCT/US2011/023684, mailed Apr. 15, 2011, 6 pages.
(Continued)

*Primary Examiner* — Yogendra Gupta
*Assistant Examiner* — Joseph Leyson (57) ABSTRACT

A die comprising two die cavities, with each capable of supplying polymeric material, and a distribution plate interposed between at least a portion of each of the two die cavities. The distribution plate has a dispensing edge and a plurality of extrusion channels. First and second extrusion channels extend from entrance openings at the first and second die cavities, respectively, to exit openings on the dispensing edge. The exit openings of the first and second extrusion channels are disposed in alternating positions along the dispensing edge. A method of extruding with such a die and an extruded article made therefrom are also disclosed. The method includes co-extruding a first polymeric composition and a second polymeric composition. The extruded article comprises a plurality of longitudinal first stripes of the first polymeric composition alternating with a plurality of longitudinal second stripes of the second polymeric composition.

20 Claims, 5 Drawing Sheets

(51) Int. Cl.
*B29C 43/22* (2006.01)
*B29C 47/00* (2006.01)
*B29C 47/12* (2006.01)
*B29L 7/00* (2006.01)
*B29L 31/00* (2006.01)

(52) U.S. Cl.
CPC ............ *B29C47/065* (2013.01); *B29C 47/145* (2013.01); *B29C 43/222* (2013.01); *B29C 47/003* (2013.01); *B29C 47/004* (2013.01); *B29C 47/0019* (2013.01); *B29C 47/0057* (2013.01); *B29C 47/0066* (2013.01); *B29C 47/128* (2013.01); *B29C 2793/0063* (2013.01); *B29K 2995/0082* (2013.01); *B29L 2007/008* (2013.01); *B29L 2031/729* (2013.01); *B29L 2031/738* (2013.01); *Y10T 428/15* (2015.01)

(56) References Cited

U.S. PATENT DOCUMENTS

| | | | |
|---|---|---|---|
| 4,152,387 A | 5/1979 | Cloeren | |
| 4,324,816 A | 4/1982 | Landis | |
| 4,426,344 A | 1/1984 | Dinter | |
| 4,435,141 A | 3/1984 | Weisner | |
| 4,533,510 A | 8/1985 | Nissel | |
| 4,787,897 A | 11/1988 | Torimae | |
| 4,894,060 A | 1/1990 | Nestegard | |
| 5,077,870 A | 1/1992 | Melbye | |
| 5,094,788 A | 3/1992 | Schrenk | |
| 5,094,793 A | 3/1992 | Schrenk | |
| 5,120,484 A | 6/1992 | Cloeren | |
| 5,269,995 A | 12/1993 | Ramanathan et al. | |
| 5,344,691 A | 9/1994 | Hanschen | |
| 5,354,597 A | 10/1994 | Capik | |
| 5,389,324 A | 2/1995 | Lewis et al. | |
| 5,429,856 A | 7/1995 | Krueger | |
| 5,462,708 A | 10/1995 | Swenson | |
| 5,501,679 A | 3/1996 | Krueger | |
| 5,620,780 A | 4/1997 | Krueger | |
| 5,773,374 A | 6/1998 | Wood | |
| 5,800,903 A | 9/1998 | Wood | |
| 5,840,412 A | 11/1998 | Wood | |
| 5,993,940 A | 11/1999 | Ouderkirk | |
| 6,090,234 A | 7/2000 | Barone | |
| 6,103,152 A | 8/2000 | Gehlsen et al. | |
| 6,106,922 A | 8/2000 | Cejka | |
| 6,159,544 A | 12/2000 | Liu | |
| 6,221,483 B1 | 4/2001 | Hilston | |
| 6,245,401 B1 | 6/2001 | Ying | |
| 6,423,140 B1 | 7/2002 | Liu | |
| 6,511,742 B1 | 1/2003 | Müssig | |
| 6,669,887 B2 | 12/2003 | Hilston | |
| 6,767,492 B2 | 7/2004 | Norquist | |
| 6,949,283 B2 | 9/2005 | Kollaja | |
| 7,048,818 B2 | 5/2006 | Krantz | |
| 7,172,008 B2 | 2/2007 | Vanbenschoten | |
| 7,316,842 B2 | 1/2008 | Zhou | |
| 7,438,961 B2 | 10/2008 | Steinke et al. | |
| 7,678,316 B2 | 3/2010 | Ausen | |
| 7,897,081 B2 | 3/2011 | Ausen | |
| 8,096,667 B2 | 1/2012 | Boyd | |
| 8,257,333 B2 | 9/2012 | Hancock-Cooke | |
| 8,758,882 B2 | 6/2014 | Ausen | |
| 2005/0060849 A1 | 3/2005 | Vanbenschoten | |
| 2005/0271861 A1 | 12/2005 | Ausen | |
| 2006/0145388 A1 | 7/2006 | Ausen | |
| 2006/0147686 A1 | 7/2006 | Ausen | |
| 2007/0108229 A1 | 5/2007 | Fork | |
| 2007/0134465 A1 | 6/2007 | Vanbenschoten | |
| 2007/0154683 A1 | 7/2007 | Ausen | |
| 2008/0078500 A1 | 4/2008 | Sher | |
| 2011/0268906 A1 | 11/2011 | Ausen | |
| 2012/0052245 A1 | 3/2012 | Hoium | |
| 2012/0263906 A1 | 10/2012 | Ausen | |
| 2013/0004723 A1 | 1/2013 | Ausen | |
| 2013/0004729 A1 | 1/2013 | Ausen | |
| 2013/0009336 A1 | 1/2013 | Ausen | |
| 2013/0011600 A1 | 1/2013 | Ausen | |
| 2014/0093703 A1 | 4/2014 | Hanschen | |
| 2014/0093716 A1 | 4/2014 | Hanschen | |

FOREIGN PATENT DOCUMENTS

| | | |
|---|---|---|
| EP | 160857 | 11/1985 |
| EP | 0191355 | 8/1986 |
| EP | 0792733 | 9/1997 |
| EP | 865904 | 9/1998 |
| EP | 1415783 | 5/2004 |
| EP | 1757429 | 2/2007 |
| JP | 4990754 | 8/1974 |
| JP | 49108870 | 9/1974 |
| JP | 53-143677 | 12/1978 |
| JP | 61-125846 | 6/1986 |
| JP | 8-300436 | 11/1996 |
| JP | 2005-14356 a | 1/2005 |
| JP | 2009-006706 | 1/2009 |
| WO | WO 91/15355 | 10/1991 |
| WO | WO 01-45918 | 6/2001 |
| WO | WO 2004-091896 | 10/2004 |
| WO | WO 2005-027676 | 3/2005 |
| WO | WO 2010-078065 | 7/2010 |
| WO | WO 2012/015593 | 2/2012 |

OTHER PUBLICATIONS

"Film with Layered Segments and Apparatus and Method for Making the Same", U.S. Appl. No. 13/782,376, filed Mar. 1, 2013.

"Context Statement—2009, CLiPS Vision and Goals", Center for Layered Polymeric Systems, Case Western Reserve University, pp. 4-7, dated 2009.

"Innovation of New Coextruded Structures: Turning Layers Around", Center for Layered Polymeric Systems, 1 page, available at http://www.stc-clips.org in Apr. 2009.

Supplementary Partial European Search Report for Application No. 11 74 0391, dated Nov. 4, 2014.

* cited by examiner

METHOD OF CO-EXTRUDING, CO-EXTRUSION DIE, AND EXTRUDED ARTICLES MADE THEREFROM

CROSS-REFERENCE TO RELATED APPLICATIONS

This application is a national stage filing under 35 U.S.C. 371 of PCT/US2011/023684, filed Feb. 4, 2011, which claims priority to U.S. Provisional Application No. 61/302,316, filed Feb. 8, 2010, the disclosure of which is incorporated by reference herein in its entirety.

BACKGROUND

Co-extrusion of multiple polymeric components into a single layer film is known in the art. For example, multiple polymeric flow streams have been combined in a die or feedblock in a layered fashion to provide a top to bottom multi-layer film. It is also known to provide more complicated co-extruded film structures where the film is partitioned, not as coextensive layers in the thickness direction, but as stripes along the width dimension of the film. This has sometimes been called "side-by-side" co-extrusion. Extruded products with side-by-side oriented stripes are described, for example, in U.S. Pat. No. 4,435,141 (Weisner et al.), U.S. Pat. No. 6,159,544 (Liu et al.), U.S. Pat. No. 6,669,887 (Hilston et al.), and U.S. Pat. No. 7,678,316 (Ausen et al.).

Even though extrusion devices are known for producing extruded products with side-by-side oriented extruded stripes, there is still a need for alternatives and improvements to such devices.

SUMMARY

In one aspect, the present disclosure provides a die useful for co-extruding at least a first extrudable polymeric composition and a second extrudable polymeric composition. The die comprises a first die cavity in a first die portion, a second die cavity in a second die portion, a distribution plate interposed between at least a portion (e.g., most or all) of the first die cavity and at least a portion (e.g., most or all) of the second die cavity. The distribution plate has a first side forming a boundary of the first die cavity, a second side forming a boundary of the second die cavity, a dispensing edge, a plurality of first extrusion channels, and a plurality of second extrusion channels. The first extrusion channels extend from entrance openings at the first die cavity to exit openings on the dispensing edge, and the second extrusion channels extend from entrance openings at the second die cavity to exit openings on the dispensing edge. The exit openings of the first extrusion channels and the exit openings of the second extrusion channels are disposed in alternating positions along the dispensing edge. Each of the first extrusion channels comprises two opposite side walls and a joining surface connecting the two opposite side walls, and wherein the joining surface of at least some of the first extrusion channels is substantially parallel to the first side of the distribution plate.

In another aspect, the present disclosure provides a method of making an extruded article, the method comprising providing the die described above, supplying a first polymeric composition into the first die cavity; supplying a second polymeric composition, different from the first polymeric composition, into the second die cavity; extruding the first polymeric composition through the plurality of first extrusion channels and the second polymeric composition through the plurality of second extrusion channels so as to form a flow stream having a width with alternating zones of the first and second polymeric compositions, and extruding the flow stream out of the die in a longitudinal direction so as to form the extruded article, the extruded article comprising a plurality of longitudinal first stripes of the first polymeric composition alternating with a plurality of longitudinal second stripes of the second polymeric composition, wherein at least some of the longitudinal first stripes have, in a plane perpendicular to the longitudinal direction, a cross-sectional shape comprising substantially parallel opposite sides.

In the die and the method according to the present disclosure, management of the flow of different polymer compositions into side-by-side lanes advantageously can be carried out using a single manifold die with a distribution plate in contrast to approaches that require multiple dies to achieve side-by-side co-extrusion. Also, in some embodiments, the die is readily modified to provide additional polymeric layers over the side-by-side lanes, which layers may be the same or different from the polymers in the side-by-side lanes. The distribution plate can be used at a die lip with a short distance between the die lip and the dispensing edge, which allows for a high level of control of the polymer lanes. The distribution plate can be relatively inexpensive to machine to meet desired requirements for thickness, lane widths, and land length and to accommodate changes in pressure and polymer melt characteristics. The use of the distribution plate disclosed herein can reduce or eliminate the need for expensive machining of the primary die halves. Also, the distribution plate having first and second sides has a geometry that allows it to readily seal against the first and second die portions. Thus, the distribution plate useful for practicing the present disclosure may provide significant cost and performance advantages over, for example, die bars with more complex geometries. Typically, the distribution plate may be understood to have two major sides, the first major side and the second major side, each connected to the dispensing edge and the opposing edge. In other words, the distribution plate may be understood to have only two sides, the first side and the second side, and only up to four edges.

The method and die according to the present disclosure can be useful, for example, for preparing extruded articles with longitudinal stripes comprising different polymeric compositions. Accordingly, in a further aspect, the present disclosure provides an extruded film having first and second lateral edges and a midline, the extruded film comprising an even number of longitudinal first stripes of a first polymeric composition comprising an inelastic polymer alternating with an odd number of longitudinal second stripes of a second polymeric composition comprising an elastomeric polymer such that the longitudinal second stripes are located at least at the first and second lateral edges and at the midline, wherein each of the longitudinal second stripes not located at the first and second lateral edges has a line of weakness along its length. Typically, at least some of the longitudinal first stripes have, in a plane perpendicular to the midline, a cross-sectional shape comprising substantially parallel opposite sides. In some embodiments, the extruded film comprises opposing major surfaces, and at least one of the major surfaces is provided with projections (e.g., with loop-engaging heads). Such films can be useful, for example, for providing hook strips comprising inelastic polymers having edges made from softer, elastomeric materials.

When preparing extruded film having projections using the methods disclosed herein, it has now been found that it is possible to control the film height by controlling the composition of the second polymeric material. Accordingly, in a further aspect, the present disclosure provides an extruded film comprising a plurality of longitudinal first stripes of a first polymeric composition comprising an inelastic polymer alternating with a plurality of longitudinal second stripes of a second polymeric composition comprising a blend of an elastomeric polymer and an inelastic polymer, wherein both the plurality of longitudinal first stripes and the plurality of longitudinal second stripes are provided with projections, the projections of the plurality of longitudinal first stripes being substantially the same height as the projections of the plurality of longitudinal second stripes. Typically, at least some of the longitudinal first stripes have, in a plane perpendicular to the longitudinal direction, a cross-sectional shape comprising substantially parallel opposite sides. "Substantially the same height" can mean, for example, that the heights of the projections of the second stripes can be within 10, 8, 5, 4, 3, 2, or 1 percent of the heights of the projections of the first stripes. Such films can be useful, for example, for providing hook strips comprising inelastic polymers having edges made from softer, elastomeric materials.

In this application, terms such as "a", "an" and "the" are not intended to refer to only a singular entity, but include the general class of which a specific example may be used for illustration. The terms "a", "an", and "the" are used interchangeably with the term "at least one". The phrases "at least one of" and "comprises at least one of" followed by a list refers to any one of the items in the list and any combination of two or more items in the list. All numerical ranges are inclusive of their endpoints and non-integral values between the endpoints unless otherwise stated.

The term "alternating" as used herein refers to one first extrusion channel or longitudinal stripe being disposed between any two adjacent second channels or stripes (i.e., second channels or stripes that only have one first channel or stripe between them) and one second channel or stripe being disposed between any two adjacent first channels or stripes.

The terms "first" and "second" are used in this disclosure. It will be understood that, unless otherwise noted, those terms are used in their relative sense only. In particular, in some embodiments certain components may be present in interchangeable and/or identical multiples (e.g., pairs). For these components, the designation of "first" and "second" may be applied to the components merely as a matter of convenience in the description of one or more of the embodiments.

The term "die" will be understood to include a die through which materials (as described herein) may be forced, pressed, pushed, shaped or otherwise directed through the die to provide the described product (e.g., extruded article or extruded film).

The term "loop-engaging" as used herein relates to the ability of a projection to be mechanically attached to a loop material. Generally, stem projections with loop-engaging heads have a head shape that is different from the shape of the stem. For example, the projection may be in the shape of a mushroom (e.g., with a circular or oval head enlarged with respect to the stem), a hook, a palm-tree, a nail, a T, or a J. The loop-engageability of projections may be determined and defined by using standard woven, nonwoven, or knit materials. A region of projections with loop-engaging heads generally will provide, in combination with a loop material, at least one of a higher peel strength, higher dynamic shear strength, or higher dynamic friction than a region of projections without loop-engaging heads. Typically, projections that have loop-engaging heads have a maximum thickness dimension of up to about 1 (in some embodiments, 0.9, 0.8, 0.7, 0.6, 0.5, or 0.45) millimeter.

The term "substantially parallel" as used herein to refer to two surfaces of the distribution plate or to two sides of a cross-sectional shape means that the two parallel surfaces or sides deviate from parallel by up to 10 (in some embodiments, up to 7.5 or 5) degrees.

The term "substantially perpendicular" as used herein to refer to the relationship between the side or rear walls of the extrusion channels and the first side of the distribution plate means that the wall and the first side deviate from perpendicular by up to 10 (in some embodiments, up to 7.5 or 5) degrees. However, substantially perpendicular side or rear walls can have a curvature at the joining surface to eliminate a dead spot in a corner of the extrusion channel.

The above summary of the present disclosure is not intended to describe each disclosed embodiment or every implementation of the present disclosure. The description that follows more particularly exemplifies illustrative embodiments. It is to be understood, therefore, that the drawings and following description are for illustration purposes only and should not be read in a manner that would unduly limit the scope of this disclosure.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

In describing preferred embodiments of the invention, specific terminology is used for the sake of clarity. The disclosure, however, is not intended to be limited to the specific terms so selected, and each term so selected includes all technical equivalents that operate similarly.

Figure 1:
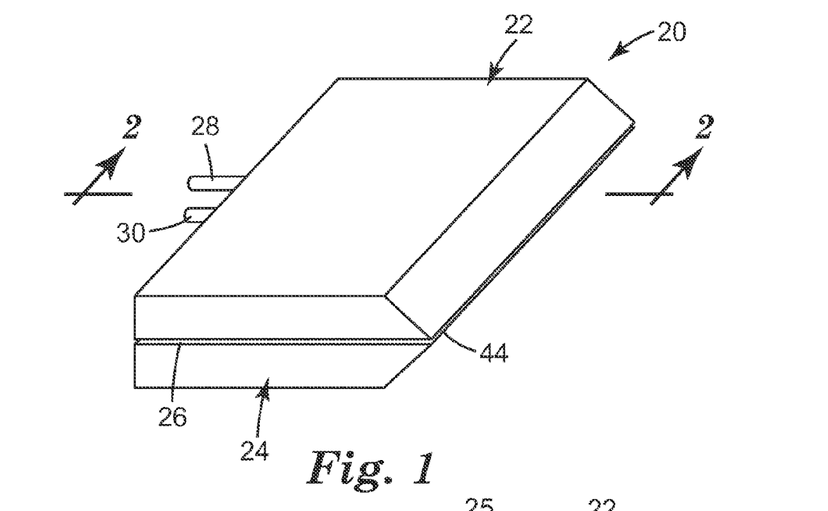
FIG. 1 is a perspective view of an extrusion die in accordance with one embodiment of the present disclosure.

Referring now to FIG. 1, the illustrated embodiment of an extrusion die 20 in accordance with the present disclosure and useful for practicing the methods disclosed herein includes a first die portion 22 and a second die portion 24. A distribution plate 26, typically in the form of a profiled metal shim, is disposed between the first and the second die portions 22 and 24. The first die portion 22 has a first inlet 28 for receiving a supply of a first extrudable polymeric composition, and the second die portion 24 has a second inlet 30 for receiving a supply of a second extrudable polymeric composition. In typical operation, the first inlet 28 and the second inlet 30 are connected to respective sources of extrudable polymeric compositions such as, for example, melt pipes or heated hoses of conventional type connected to pumps or screw extruders. In some embodiments, the materials may be supplied to the die using one or more extruders (e.g., single or twin screw). In other embodiments, the materials may be supplied to the die using, for example, a grid melter and a gear pump, or other sources of molten material (e.g., molten polymeric material).

Figures 2, 2A:
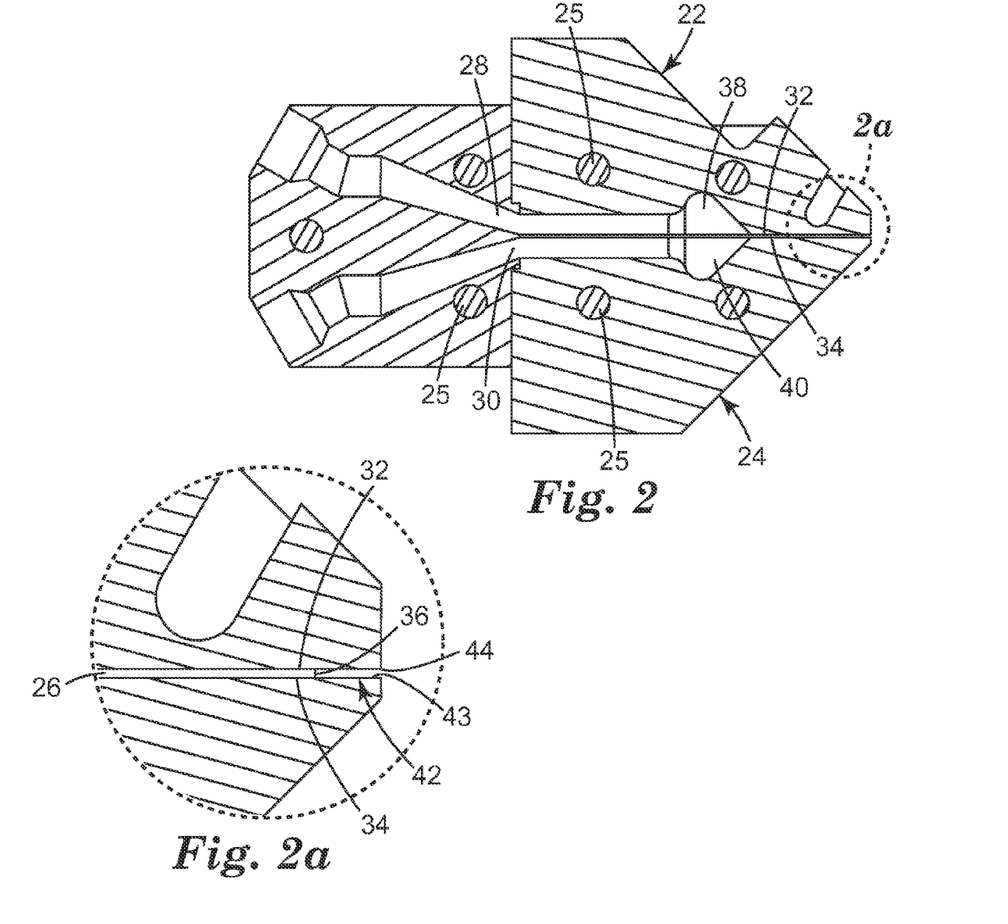
FIG. 2 is a cross-sectional side view of the extrusion die of FIG. 1, taken along section lines 2-2 in FIG. 1.
FIG. 2a is an enlargement of a region marked 2a in FIG. 2.

Referring now to FIGS. 2 and 2a, the distribution plate 26 has a first side 32 and a second side 34 and a dispensing edge 36. The distribution plate 26 can be, for example, an integral or separate shim, membrane or other dividing partition disposed so as to separate the first and second die cavities 38, 40. The first side 32 of the distribution plate 26 and the first die portion 22 together define a first die cavity 38, and the second side 34 of the distribution plate 26 and the second die portion 24 together define a second die cavity 40. Heating elements 25 can be positioned in each die portion. In the depicted exemplary embodiment, the die portions 22 and 24 together define a recessed cavity 42 formed in front of the dispensing edge 36 and recessed back inside the die 20 from a die lip 44 through which polymeric materials are extruded. The recessed cavity 42 includes a land 43. During use of the die 20, the cavities 38 and 40 on either side of the distribution plate 26 will be filled with pressurized extrudable polymeric material. Therefore, care should be taken so that the pressure differential between these cavities 38 and 40 does not exceed the physical distortion strength of the distribution plate 26. In some embodiments, the distribution plate is at least 2.5, 3, 3.5, 4, 4.5, 5, 6, 7, 8, 9, or 10 millimeters (mm) thick.

In some embodiments, the die according to and/or useful for practicing the present disclosure comprises a die lip 44 (e.g., in the form of a slot or any desired shape) through which an extrudate comprising the first and second polymeric compositions can be extruded. As shown in FIG. 2a, the distribution plate 26 from the extrusion die 20 according to and/or useful for practicing the present disclosure can be designed and placed so that the dispensing edge 36 is recessed back from the die lip 44 and the cavity 42 can be formed. Recessing the dispensing edge 36 and forming the recessed cavity 42 are useful in many embodiments, but it is not considered a requirement of the present disclosure. In some embodiments, the dispensing edge is within about 2.5 centimeters (cm) from the die lip. In some embodiments, the dispensing edge is within about 7.5, 6.25, 5, 3.75, 2.5, 1.9, 1.3, 0.635, or 0.5 cm from the die lip. For example, the dispensing edge may be in a range from about 0.5 to 7.5 cm, 0.5 to 2.5, or 0.635 to 2.5 cm from the die lip. The distance between the dispensing edge and the die lip should typically be long enough to establish the flow of the polymer extrudate, which typically requires that the distance over the height of the polymer is in a range from 1 to 10. If the distance between the dispensing edge and the die lip is too long, for example, longitudinal stripes at the edges of the polymer extrudate may become distorted. The walls of recessed cavity 42 can be straight (i.e., the die opening can be dimensionally comparable in height to the dispensing edge) or tapered toward the die lip 44 (i.e., the die opening can be smaller in height than the dispensing edge). It can also be desirable to have the recessed cavity taper in width, for example, after the flowstreams combine.

Figure 3:
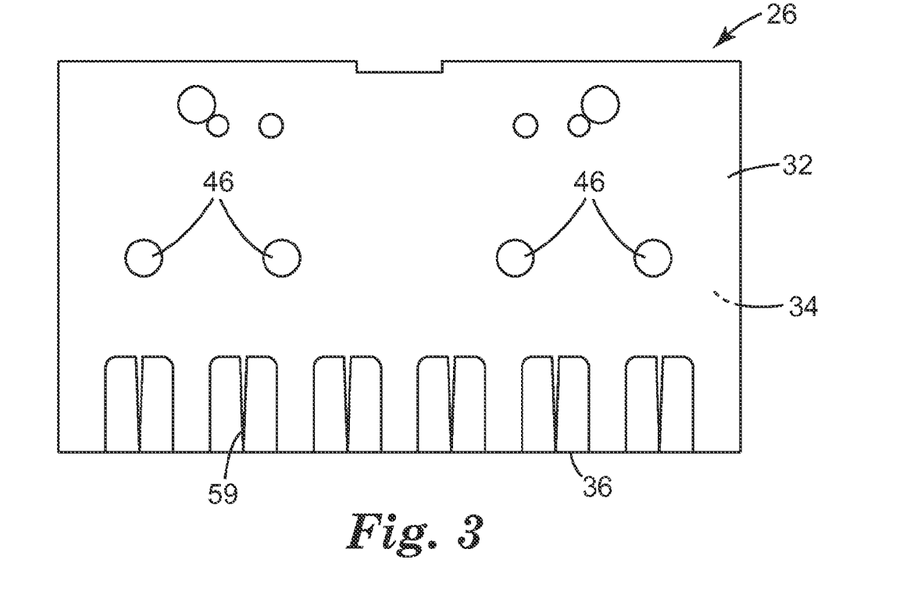
FIG. 3 is a top view of a distribution plate from the extrusion die of FIGS. 1 and 2, shown in isolation.

Referring now to FIG. 3, several through holes 46 can be formed through the distribution plate 26 for receiving therethrough a mechanism (e.g. machine bolts) for holding the various components of the extrusion die 20 together as an assembly.

Figure 4:
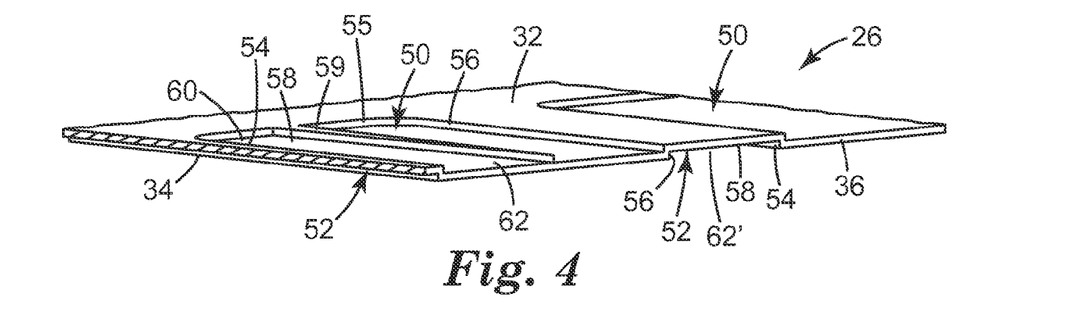
FIG. 4 is a perspective view of a distribution plate from the extrusion die of FIGS. 1 and 2, shown in isolation.

In the embodiment of the distribution plate according to and/or useful for practicing the present disclosure shown in FIG. 4, the first and second extrusion channels 50, 52 are in the form of grooves cut into the distribution plate 26. Each of the channels can also be, for example, in the form of a tunnel or other pathway cut or otherwise formed in the distribution plate. Referring to FIG. 4, a first plurality of channels 50 in the form of grooves have been cut into the first side 32 of distribution plate 26 such that in the assembled die 20 the channels 50 extend from (i.e., connect) the first cavity 38 to the dispensing edge 36. Further, a second plurality of channels 52 in the form of grooves have been cut into the second side 34 of distribution plate 26 such that in the assembled die 20 the channels 52 extend from (i.e., connect) the second cavity 40 to the dispensing edge 36. Each of the channels 50 and 52, or grooves as shown, comprises opposite side walls 54 and 56, a rear wall 55 between the opposite side walls 54 and 56, a joining surface 58 that connects the side walls 54 and 56 together (i.e., a bottom floor in the case of the first channels 50 and a top ceiling in the case of the second channels 52), an entrance opening 60 on the corresponding side of the distribution plate 26 and an exit opening 62, 62' on the dispensing edge 36 of the distribution plate 26 opposite the rear wall 55. As illustrated, the channels 50 and 52 are disposed in alternating positions along the dispensing edge 36 such that one first channel 50 is disposed between any two adjacent second channels 52. Similarly, one second channel 52 is disposed between any two adjacent first channels 50.

The first extrusion channels 50 and second extrusion channels 52 can be formed in the distribution plate 26 by a number of different methods (e.g., milling, plunge electrical discharge machining (EDM), acid etching, e-beam machining, or diamond machining). The present disclosure is not intended to be limited to the type of forming technique or equipment used to make the channels 50 and 52.

The profiles of the first and second channels 50, 52 can be similar or different. For example, the opposite side walls 54, 56 of each channel can be parallel to each other or at an angle (e.g., an acute, right or obtuse angle) to each other. In some embodiments, the opposite side walls 54, 56 of each channel are substantially parallel to each other. In addition, the side walls 54, 56 of the first channels 50 can be formed perpendicular or slanted at an angle (other than a right angle) to the first side of the distribution plate 26, or the side walls 54, 56 of the first channels 50 can be formed so as to taper out from their joining surface 58 to the first side 32 and the dispensing edge 36 of the distribution plate 26 (i.e., the distance between the side walls adjacent the joining surface can be smaller than the distance between the side walls either adjacent the first side of the distribution plate, adjacent the dispensing edge, or both). Likewise, the side walls 54, 56 of the second channels 52 can be formed perpendicular or slanted at an angle (other than a right angle) to the second side 34 of the distribution plate 26, or the side walls 54, 56 of the second channels 52 can be formed so as to taper out from their joining surface 58 to the second side and the dispensing edge of the distribution plate 26 (i.e., the distance between the side walls adjacent the joining surface can be smaller than the distance between the side walls either adjacent the second side of the distribution plate, adjacent the dispensing edge, or both). The side walls 54, 56 of both sets of channels 50, 52 can be perpendicular to or slanted or tapered out relative to their corresponding side of the distribution plate 26 and the dispensing edge 36, or one set of channels (e.g., 50) can be perpendicular and the other set (e.g, 52) tapered or slanted. The use of slanted die channels 50, 52 will create slanted zones, relative to the plane of the extrudate (e.g., a film). Other shapes besides perpendicular, slanted and tapered may be used when convenient in connection with the present disclosure.

Figure 4A:
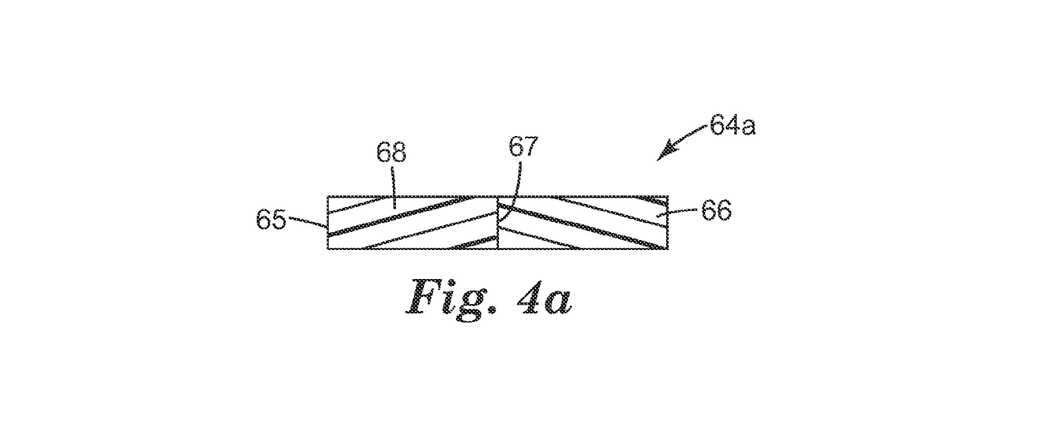
FIG. 4a is a cross-sectional side view of an embodiment of at least a portion of an extruded article preparable from a die and method according to the present disclosure.

The joining surface 58 of at least some (e.g., most or all) of the first extrusion channels 50 is substantially parallel to the first side 32 of the distribution plate 26. In some embodiments, the joining surface 58 of at least some (e.g., most or all) of the second extrusion channels 52 is substantially parallel to the second side 34 of the distribution plate. In some embodiments, the joining surface 58 of at least some (e.g., most or all) of both the first extrusion channels 50 and the second extrusion channels are substantially parallel to the first and second substantially parallel sides of the distribution plate. A joining surface 58 that is substantially parallel to the first or second side of the distribution plate will typically form zones in the extrudate with substantially parallel side edges. A cross-sectional side view of at least a portion of the resulting extruded article is shown in FIG. 4*a*. In the extruded article 64*a*, the longitudinal stripes 66, 68 will each have a cross-sectional shape in a plane perpendicular to the longitudinal direction with substantially parallel side edges 65 and 67. In contrast, if the joining surface 58 of an extrusion channels 50 slopes at an angle (e.g., an acute angle) toward the dispensing edge, the resulting different flow path lengths in the extrusion channel would typically lead to triangular shaped zones in the extrudate.

Depending on the desired configuration of the resulting extrudate, it can be desirable for the exit openings 62 of the first channels 50 to extend from the first side 32 of the distribution plate 26 toward but not all the way to the second side 34 of the distribution plate 26, for the exit openings 62' of the second channels 52 to extend from the second side 34 of the distribution plate 26 toward but not all the way to the first side 32 of the distribution plate 26, or both. In this way, the degree to which the exit openings 62, 62' of the first and second channels 50, 52 overlap each other can be varied (e.g., the first and second exit openings can have no overlap, can have some overlap or completely overlap), as desired. Alternatively, the exit openings 62 of the first channels 50 can extend from the first side 32 to the second side 34 of the distribution plate 26 (i.e., across the entire thickness of the distribution plate 26), the exit openings 62' of the second channels 52 can extend from the second side 34 to the first side 32 of the distribution plate 26 (i.e., across the entire thickness of the distribution plate 26), or both. A combination can also be used.

In some embodiments of the die according to and/or useful for practicing the present disclosure, a pair of first and second extrusion channels 50, 52 can have unequal widths. In some embodiments, a pair of first and second extrusion channels 50, 52 can have unequal depths. In some embodiments, a pair of first and second extrusion channels 50, 52 can have both unequal widths and unequal depths. In some embodiments, the first extrusion channel exit opening 62 has at least one of a width that is at least ten (in some embodiments, at least 20, 30, 40, 50, 60, 70, 80, 90, 100, 200, 300, 400, or 500) percent larger than the width of at least one of the two adjacent second extrusion channel exit openings 62' or a depth that is at least ten (in some embodiments, at least 20, 30, 40, 50, 60, 70, 80, 90, 100, or 200) percent larger than the depth of at least one of the two adjacent second extrusion channel exit openings 62'. The width and depth of the first and second extrusion channels 50, 52 can be adjusted, for example, to accommodate the properties of the extruded polymer (e.g., viscosity, shear sensitivity, and flow resistance, which can increase as the reciprocal of the third power of the channel width) and to achieve the desired width of the longitudinal stripes in an extruded article.

The width of the exit openings 62, 62' of the first and second extrusion channels 50, 52 can be adjusted as desired for a given application. In some embodiments, the width of the second extrusion channel 52 exit openings 62' is greater than 1.5 mm (in some embodiments, at least 2, 3, 4, 5, or 6 mm), for example, in a range from 1.5 mm to 15 mm, 1.5 mm to 12 mm, or 2 mm to 10 mm. Typically the width of the first extrusion channel 52 exit openings 62 is larger than the second extrusion channel exit openings (e.g., at least 10 percent larger as described above) and can be at least 5, 6, 7, 8, 9 or 10 mm, for example, in a range from 10 mm to 25 mm, 15 mm to 25 mm, or 15 mm to 20 mm. The maximum width of the exit openings 62, 62' of the first and second extrusion channels 50, 52 is generally determined by the fabricating machinery width limitations and can be, for example, at least 75, 80, 90, or 100 cm. Widths can be adjusted to allow for fabrication of extruded polymeric films for a wide variety of potential uses.

The depth of the exit openings 62, 62' of the first and second extrusion channels 50, 52 can be adjusted as desired for a given application and may only be limited by the thickness of the distribution plate. In some embodiments, the distribution plate is at least 5, 6, 7, 8, 9, or 10 mm thick. In some embodiments, the distribution plate has a thickness of up to 20, 25, or 30 mm. In some embodiments, the depth of the second extrusion channel 52 exit openings 62' is at least 0.25 mm (in some embodiments, at least 0.5, 1, 2, 3, 4, or 5 mm). The depth of the first extrusion channel 52 exit openings 62 can be larger than the second extrusion channel exit openings (e.g., at least 10 percent larger as described above) and can be at least 1, 2, 3, 4, 5, 6, 7, 8, 9 or 10 mm.

In the embodiment of the distribution plate 26 illustrated in FIG. 4, both the first extrusion channels 50 and the second extrusion channels 52 have side walls 54 and 56 and a rear wall 55 that are substantially perpendicular to the corresponding side of the distribution plate 26 from which they are cut. The extrusion channels can be said to be box-shaped. The first extrusion channels 50 and the second extrusion channels 52 have unequal widths (i.e., their corresponding side walls are not spaced apart the same distance). Furthermore, in the illustrated embodiments, the exit openings 62 of the first extrusion channels 50 extend from the first side 32 of the distribution plate 26 to a middle portion of the distribution plate 26 between the first side 32 and the second side 34, and the exit openings 62' of the second extrusion channels 52 extend from the second side 34 of the distribution plate 26 to the middle portion such that the exit openings 62 of the first extrusion channels 50 and the exit openings 62' of the second extrusion channels 52 do not overlap.

The distribution plate 26 is typically compressed so as to form a tight seal in a region adjacent to the dispensing edge 36 between both first die portion 22 and second die portion 24. These seals keep the flowing polymeric material in cavities 38 and 40 entirely separate until they are dispensed from the dispensing edge 36. The distance along distribution plate 26 where the first and second die portions 22 and 24 seal against distribution plate 26 needs to be long enough to provide a robust seal and structural strength. The first polymeric material in the first cavity 38 can only reach dispensing edge 36 by entering the openings 60 of first grooves 50 in the direction from the first cavity 38 to the dispensing edge 36, and the second polymeric material in the second cavity 40 can only reach dispensing edge 36 by entering the openings (not labeled) of first grooves 52 in the direction from the second cavity 40 to the dispensing edge 36. In some embodiments, the sealing of the first and second die portions and the distribution is aided by the use of adhesives and/or gaskets.

In some embodiments, the cross-sectional shape of the distribution plate 26 when viewed from the dispensing edge 36 is generally rectangular, which is advantageous for forming a tight seal between the first die portion 22 and the second die portion 24. Thus the die according to and/or useful for practicing the present disclosure can have advantages over more complex dies that have three die portions that need to be sealed against a die bar at angles to each other. In some embodiments, the distribution plate does not have a cross-sectional shape that is pentagonal. In some embodiments, the cross-sectional shape of the distribution plate in a plane perpendicular to the dispensing edge is also rectangular; in other embodiments, this cross-section is generally wedge-shaped to provide the distribution plate with more stiffness in the region near the dispensing edge.

In the embodiment illustrated in FIG. 4, some of the entrance openings 60 of the first extrusion channels 50 (grooves as shown) comprise reinforcing members 59 extending from the distribution plate 26 along the entrance openings 60 toward the dispensing edge 36. In some embodiments, at least some of the entrance openings 60 of the first extrusion channels 50 comprise reinforcing members 59. In some embodiments, all of the entrance openings 60 of the first extrusion channels 50 comprise reinforcing members 59. In some of these embodiments, the entrance openings of the second extrusion channels 52 do not comprise reinforcing members 59. As shown FIG. 4, reinforcing member 59 extends across the joining surface 58 and tapers in the direction of dispensing edge 36. The reinforcing member 59 in the illustrated embodiment divides channel 50 such that the first extrusion channel entrance openings 60 are separated into two sub-channels, but the tapering of the reinforcing member 59 may allow for combining a flow stream at the first extrusion channel exit openings 62. The reinforcing member 59 may extend all the way across the joining surface 58 to the dispensing edge 36 as shown in FIG. 4, or the reinforcing member 59 may extend only part of the way across the joining surface 58. Reinforcing members formed in the distribution plate 26 may be useful, for example, for structural reinforcement of channels having widths of at least 15 mm to reduce deflection of the distribution plate 26 and prevent polymeric compositions on one side 34 of the distribution plate 26 from crossing over into lanes on the other side 32 of the distribution plate 26. Although the illustrated embodiment shows reinforcing members 59 in the form of ribs extending across the entrance openings 60, other types of reinforcing members (e.g., joists, rafters, and posts) are envisioned.

The die and method according to the present disclosure are useful for extruding two different polymeric compositions. The phrase "different polymeric compositions" and the phrase "second polymeric composition different from the first polymeric composition" refers to having at least one difference. For example, the different polymeric compositions could be made of different polymers or a different blend of the same polymers or could have different additives (e.g., colorants, plasticizers, compatibilizer, or gas) in the same polymer or polymer blend.

Any two polymeric compositions that can be made to flow through the first and second extrusion channels 50, 52 may be used. The mass flow (or volume flow) of the two different polymeric compositions, as they are respectively extruded through the first and second extrusion channels 50, 52 can be equal or unequal. Depending on the intended end use, the two polymeric compositions may adhere to each other with a strong cohesive or adhesive bond, or be readily separable from each other (i.e., the bond between the first and second zones may be relatively easy to break). A polymeric composition can be selected for its surface properties or its bulk properties (e.g., tensile strength, elasticity, color, etc). Furthermore, a polymeric composition can be selected to provide specific functional or aesthetic properties in the extruded article such as elasticity, softness, hardness, stiffness, bendability, roughness, colors, textures, or patterns.

In some embodiments, the polymeric compositions that may be extruded in the die disclosed herein are thermoplastic polymeric compositions (e.g., polyolefins (e.g., polypropylene and polyethylene), polyvinyl chloride, polystyrenes and polystyrene block copolymers, nylons, polyesters (e.g., polyethylene terephthalate), polyurethanes, and copolymers and blends thereof). However, the die according to the present disclosure may also be useful for co-extruding polymeric materials that can be crosslinked (e.g., by heat or radiation). When a heat curable resin is used, the die 20 can be heated to start the cure so as to adjust the viscosity of the polymeric material and/or the pressure in the corresponding die cavity 38 and 40.

Co-extruding two different polymeric compositions may be useful, for example, for providing extruded articles having stripes with different tactile properties. One stripe may be softer to the touch than an adjacent stripe. Such extruded can be useful, for example, for providing hook fastener strips comprising soft edges. A second longitudinal stripe can be made softer than an adjacent first longitudinal stripe, for example, by using a second polymeric composition that is more elastomeric than the first polymeric composition or by using a second polymeric composition that is foamed.

In some embodiments, at least one of the two different polymeric compositions is foamed. For example, in some embodiments, the second polymeric composition is foamed. In these embodiments, the second polymeric composition may have the same composition as the first polymeric composition, except for the presence of gas in the composition, or the second polymeric composition may be made from a different polymer or different polymer blend from the first polymeric composition. Foamed polymeric compositions can be prepared, for example, using a chemical foaming agent (e.g., a foaming agent available from Clariant Corp., Holden, Mass., under the trade designation "HYDROCEROL") or by injecting a gas (e.g., carbon dioxide or nitrogen) into the polymeric composition.

In some embodiments of the method of making an extruded article and the extruded articles according to the present disclosure, a first polymeric composition comprising an inelastic polymer and a second polymeric composition comprising an elastomeric polymer are extruded. The term "inelastic" refers to polymers from which films (0.002 to 0.5 mm thick) can be made that have little or no recovery from stretching or deformation. The first polymeric composition can be formed, for example, of semicrystalline or amorphous polymers or blends. Inelastic polymers can be polyolefinic, formed predominantly of polymers such as polyethylene, polypropylene, polybutylene, or polyethylene-polypropylene copolymers. In some embodiments, the first polymeric composition comprises polypropylene, polyethylene, polypropylene-polyethylene copolymer, or blends thereof.

The term "elastomeric" refers to polymers from which films (0.002 to 0.5 mm thick) can be made that exhibit recovery from stretching or deformation. Exemplary elastomeric polymeric compositions which can be used in the segmented multicomponent polymeric films disclosed herein include thermoplastic elastomers such as ABA block copolymers, polyurethane elastomers, polyolefin elastomers (e.g., metallocene polyolefin elastomers), polyamide elastomers, ethylene vinyl acetate elastomers, and polyester elastomers. An ABA block copolymer elastomer generally is one where the A blocks are polystyrenic, and the B blocks are conjugated dienes (e.g., lower alkylene dienes). The A block is generally formed predominantly of substituted (e.g, alkylated) or unsubstituted styrenic moieties (e.g., polystyrene, poly(alphamethylstyrene), or poly(t-butylstyrene)), having an average molecular weight from about 4,000 to 50,000 grams per mole. The B block(s) is generally formed predominantly of conjugated dienes (e.g., isoprene, 1,3-butadiene, or ethylene-butylene monomers), which may be substituted or unsubstituted, and has an average molecular weight from about 5,000 to 500,000 grams per mole. The A and B blocks may be configured, for example, in linear, radial, or star configurations. An ABA block copolymer may contain multiple A and/or B blocks, which blocks may be made from the same or different monomers. A typical block copolymer is a linear ABA block copolymer, where the A blocks may be the same or different, or a block copolymer having more than three blocks, predominantly terminating with A blocks. Multi-block copolymers may contain, for example, a certain proportion of AB diblock copolymer, which tends to form a more tacky elastomeric film segment. Other elastomers can be blended with block copolymer elastomers provided that the elastomeric properties are not adversely affected. Many types of thermoplastic elastomers are commercially available, including those from BASF under the trade designation "STYROFLEX", from Shell Chemicals under the trade designation "KRATON", from Dow Chemical under the trade designation "PELLETHANE" or "ENGAGE", from DSM under the trade designation "ARNITEL", from DuPont under the trade designation "HYTREL", and more. The thermoplastic elastomers, including tetrablock styrene/ethylene-propylene/styrene/ethylene-propylene, described in U.S. Pat. No. 6,669,887 (Hilston et al.) may also be useful.

Elastomeric compositions may be selected, for example, for their compatibility or adhesion to inelastic compositions in an adjacent longitudinal stripe in the extruded article disclosed herein. First and second polymeric compositions which have good mutual adhesion properties, for example, may be selected. End block reinforcing resins and compatibilizers may also be used within second polymeric compositions.

In some embodiments, the second polymeric composition is a pressure sensitive adhesive. In some embodiments, the second polymeric composition is not a pressure sensitive adhesive. Pressure sensitive adhesives are well known to those of ordinary skill in the art to possess properties including the following: (1) aggressive and permanent tack, (2) adherence with no more than finger pressure, (3) sufficient ability to hold onto an adherend, and (4) sufficient cohesive strength to be cleanly removable from the adherend. In some applications (e.g., for hook fastener strips having soft edges), it is desirable for the second polymeric composition to not feel tacky to the touch.

In some of embodiments of the method of making an extruded article and the extruded articles according to the present disclosure, the second polymeric composition comprising an elastomeric polymer further comprises an inelastic polymer. In some embodiments, when co-extruding certain inelastic polymers (e.g., polypropylene) and certain thermoplastic elastomers in alternating side-by-side stripes using the die and methods disclosed herein, the thermoplastic elastomer stripe is significantly thinner than the stripe of the inelastic polymer. The present inventors have found that including the inelastic polymer in the thermoplastic elastomer can be used to control the thickness of the second polymeric composition as it is extruded. The ratio of thermoplastic elastomer to inelastic polymer in the second polymeric composition may be in a range, for example, from 99.5:0.5 to 0.5:99.5, 99.5:0.5 to 10:90, 99.5:0.5 to 25:75, 99.5:0.5 to 50:50, 99:1 to 25:75, 95:5 to 25:75, 90:10 to 25:75, or 90:10 to 50:50. Controlling the ratio of thermoplastic elastomer to inelastic polymer in the second polymeric composition may also be useful, for example, for controlling the height of projections in embodiments of extruded articles provided with projections and for controlling the ability to slit or perforate the longitudinal stripe comprising the second polymeric composition, as described further below.

The extruded article produced according to the present method can comprise a plurality of longitudinal first stripes of the first polymeric material alternating with a plurality of longitudinal second stripes of the second polymeric material. One first stripe is disposed between any two adjacent second stripes, and one second stripe is disposed between any two adjacent first stripes. In some embodiments, at least one of the longitudinal first stripes and at least one of the longitudinal second stripes are integrally joined together. The joining of at least one of the longitudinal first stripes and at least one of the longitudinal second stripes can be accomplished on the land 43 in the cavity 42 between the dispensing edge 36 and the die lip 44 as shown in FIG. 2a. Typically, the longitudinal first stripes are generally parallel to one another, the longitudinal second stripes are generally parallel to one another, and the longitudinal first and second stripes are generally parallel to each other. Each of the stripes can have a number of different cross sectional shapes.

The co-extruded stripes prepared according to the method disclosed herein allow for alternating polymeric compositions arranged in the width direction (cross or x direction), which stripes extend along the length of the article or film (the y direction or machine direction). In some embodiments, the polymeric composition of each stripe is generally consistent in the thickness direction (z direction) of the article (e.g., film). That is, although there may be some inhomogeneities in the first or second polymeric composition, in some embodiments, the stripes are not segmented in the z direction of the film.

In some embodiments, the method of making an extruded article according to the present disclosure comprises co-extruding a layer on at least one of the opposing major surfaces of the extruded article. "Co-extruding" refers to applying the layer within the die disclosed herein rather than in a post-extrusion step. The layer may have any desired thickness. In some embodiments, the layer may be considered a skin layer, which may have a thickness, for example, that is up to 10, 8, 6, 5, 4, 3, or 2 percent of the thickness of the extruded article (e.g., film). Therefore, in embodiments of an article (e.g., film) in which there are skin layers on both of the opposing surfaces of the extruded article, the thickness of the stripe of the first or second polymeric composition may be at least 80, 85, 90, 95, or 96 percent of the thickness of the extruded article.

Although the co-extruded layer could be formed from one of the first polymeric composition or the second polymeric composition, in some embodiments, the layer comprises a third polymeric composition that is different from both the first polymeric composition and the second polymeric composition. As above, the term "different" used here refers to having at least one difference. For example, the third polymeric composition could be made of a different polymer than the first and second polymeric compositions or a different blend of the same polymers. Also, the third polymeric composition could have an additive (e.g., colorants, plasticizers, or compatibilizer) not found in the first or second polymeric composition or could lack an additive (e.g., colorants, plasticizers, or compatibilizer) that is present in one of the first or second polymeric compositions. A cross-sectional view of a portion of an exemplary extruded article 64*b* is shown in FIG. 5*b*, where longitudinal stripes 68, 66 composed of the first and second polymeric compositions, respectively, have co-extruded layers 70.

Figure 5:
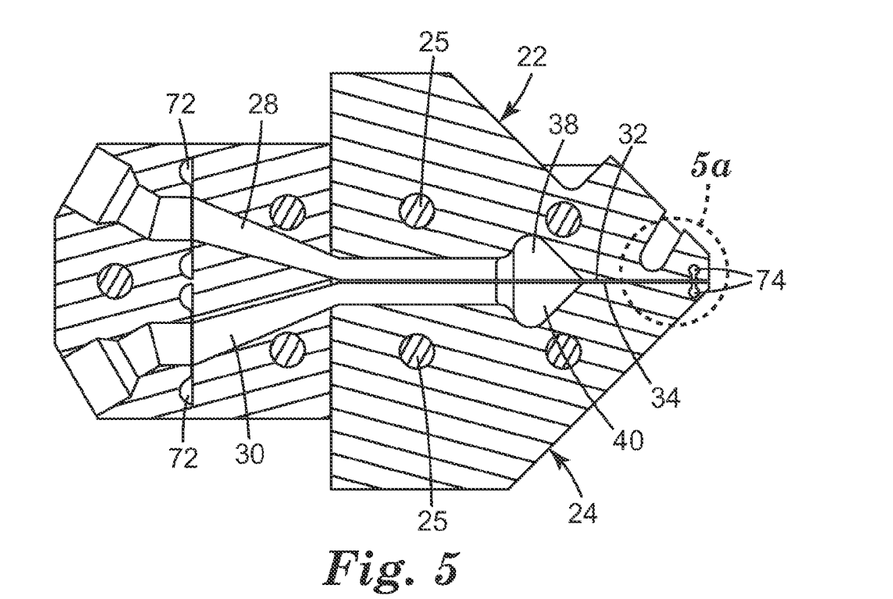
FIG. 5 is a cross-sectional side view of the extrusion die of FIG. 1, taken along section lines 2-2 in FIG. 1, and having ports at the tip of the die or the back of the die for forming co-extruded layers.
Figure 5A:
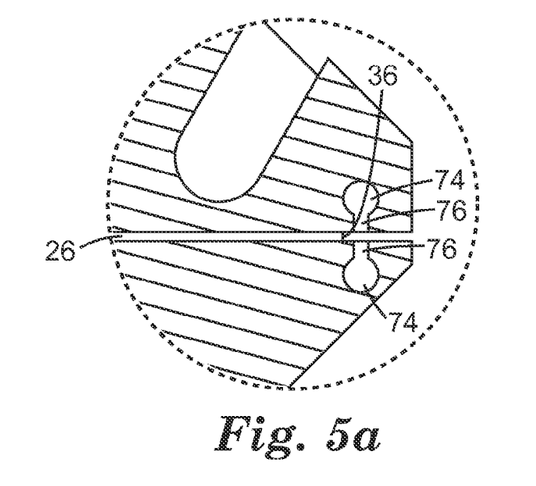
FIG. 5a is an enlargement of a region marked 5a in FIG. 5.
Figure 5B:
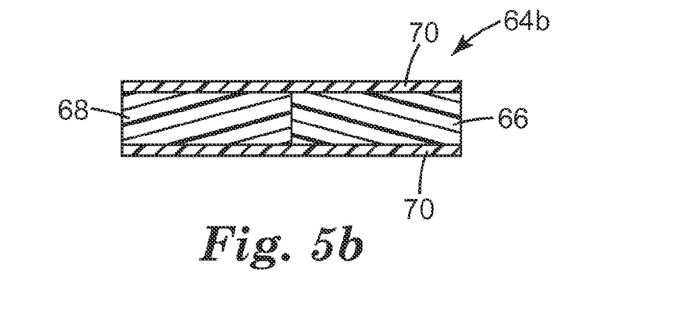
FIG. 5b is a cross-sectional side view of an embodiment of at least a portion of an extruded article having co-extruded layers preparable using the extrusion die of FIG. 5.

FIG. 5 illustrates a cross-sectional side view of the die according to and/or useful for practicing the present disclosure, wherein the die has ports at the tip of the die or the back of the die for forming co-extruded layers. Although FIG. 5 shows ports 74 at the lip of the die and ports 72 at the back of the die, it should be understood that the die need not have both of these features in order to form co-extruded layers. Referring now to FIG. 5*a*, each die portion 22 and 24 has a port 74 near the die lip into which a third polymeric composition could be fed. In the illustrated embodiment, the ports 74 are between the die lip 44 and the dispensing edge 36 of the distribution plate 26. The third polymeric composition could be fed into at least one of the ports 74 and exit the corresponding slit 76 to form a co-extruded layer on at least one of the opposing major surfaces of the extruded article. The ports 74 could be introduced into the die portions 22, 24 by drilling or other suitable methods. The ports 74 may be useful for forming co-extruded layers on a relatively narrow die (e.g., up to about 25 cm wide). In this embodiment, layers 70 on the opposing faces of extruded article 64 may be the same or different. Also shown in FIG. 5 are ports 72 at the back of the die. The ports 72 are in the form of annular rings around the inlets 28 and 30. The annular rings can be substantially round or oval. In this embodiment, the third polymeric composition can surround the first and second polymeric compositions as they are extruded into their respective die cavities 38, 40 and through their respective extrusion channels 50, 52 on the distribution plate.

Figure 9:
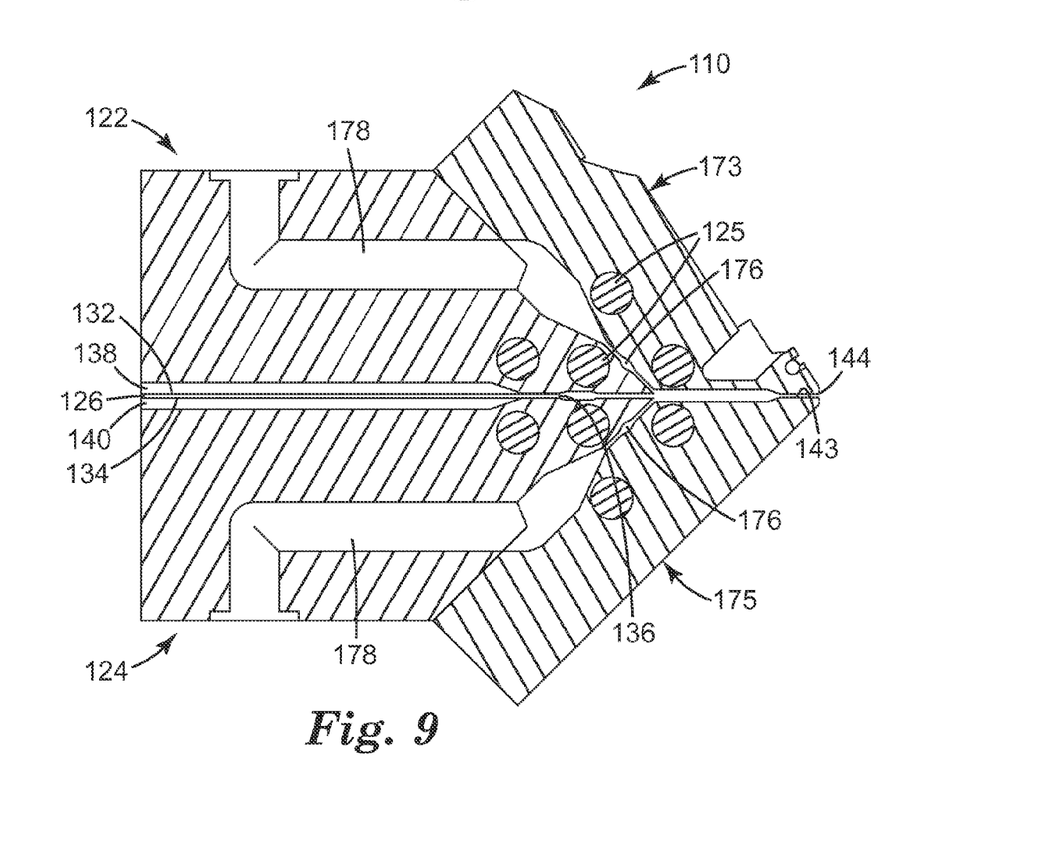
FIG. 9 is a cross-sectional side view of an extrusion die according to another embodiment, which die can be useful for forming co-extruded layers.

Co-extruded layers can also be formed in a method according to the present disclosure using a multiple manifold die 110 as illustrated in FIG. 9. In the illustrated embodiment, manifold 175 is positioned next to die portion 124, and manifold 173 is position next to die portion 122. The first side 132 of the distribution plate 126 and the first die portion 122 together define a first die cavity 138, and the second side 134 of the distribution plate 126 and the second die portion 124 together define a second die cavity 140. Although not shown in FIG. 9, inlets may be used to introduce first and second polymeric compositions into first and second die cavities 138 and 140, respectively, using inlets as shown in FIGS. 2 and 5. Inlets 178 can be used to introduce a third polymer composition or third and fourth polymeric compositions to manifolds 175 and 173. The third polymeric composition or third and fourth polymeric compositions are extruded through channels 176 to provide layers on the top and bottom surfaces of the extrudate exiting the dispensing edge 136 of distribution plate 126. The manifolds 173 and 175 may be at an angle (e.g., about a 20 to 50 or a 30 degree angle) to the distribution plate 126. Heating elements 125 can be positioned in each die portion 122 and 124 and in manifolds 173 and 175.

Referring again to FIG. 9, an extruded article having co-extruded top and bottom layers is formed after the extrudate reaches land 143 and is extruded out of die lip 144. The third and fourth polymeric compositions may be different from each other and each may be different from the first and second polymeric compositions. Therefore, the die and method according to the present disclosure may be useful for forming extruded article 64*b* where the longitudinal first and second stripes 66 and 68 and the two co-extruded layers 70 illustrated in FIG. 5*b* are each made from different polymeric compositions.

Although FIG. 9 illustrates a three-manifold die 110 with a center manifold divided by distribution plate 126 to define cavities 138 and 140, other configurations may be useful for providing co-extruded layers downstream of the distribution plate 126. Some useful configurations include additional manifolds for providing multiple co-extruded layers (e.g., more than one layer on each opposing surface) on the extruded article.

In some embodiments, the method and/or die according to the present disclosure can be useful for forming extruded articles that are segmented in the thickness direction. For example, two or more dies according to the present disclosure can be used in combination to provide a multi-layer article. Each layer may have a different arrangement of at least two different polymeric compositions in segments that alternate along the film's cross direction and extend longitudinally.

In some embodiments of the method according to the present disclosure, the die may dispense the flow stream into free space, or in some embodiments, the flow stream may be taken up onto a roller, web, or substrate. Once the extruded article has been formed, various secondary operations may then be performed on the article. Examples of such secondary operations may include embossing, laminating, slitting, knurling, and length and/or width stretching. For example, the extruded article can comprise opposite major surfaces, and the method can further comprise providing projections on at least one of the major surfaces (e.g., by microreplicating or otherwise replicating a pattern in one or both of the major surfaces of the extruded article). Providing such projections can comprise contacting one or both of the major surfaces of the extruded article with a patterned roll, patterned belt, patterned film, or a combination thereof. The method can also comprise quenching or heating the extruded article respectively on a chilled or heated surface of, for example, a roller, web, flat or curved plate, or substrate.

Figure 6:
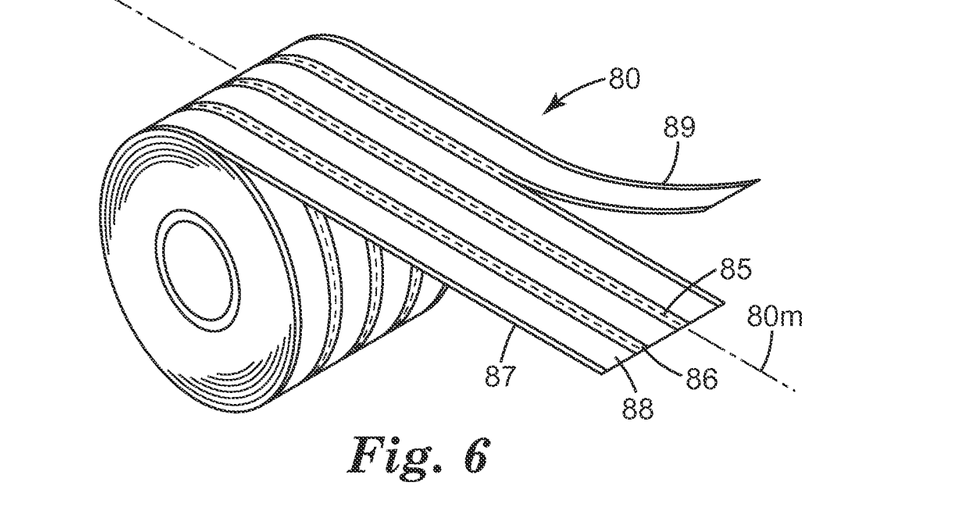
FIG. 6 is a perspective view of an embodiment of an extruded article according to the present disclosure, the extruded article being in the form of a roll.

FIG. 6 illustrates an embodiment of an extruded article according to and/or made according to the present disclosure, the extruded article being a film in the form of a roll. In the illustrated embodiment, the extruded article 80 comprises an even number (4 as shown) of first longitudinal stripes 88 and an odd number (5 as shown) of second longitudinal stripes 86. Different numbers of stripes may also be useful; for example, 2 or 6 first longitudinal stripes 88 can alternate with 3 or 7, respectively, second longitudinal stripes 86. The second longitudinal stripes 86 are typically located at the first and second lateral edges 87, 89 and along the midline 80*m* of the film. In the illustrated embodiment, each of the second longitudinal stripes not located at the first or second lateral edge has a line of weakness 85 along its length. The line of weakness may be in the form of, for example, a series of perforations or slits. The line of weakness may also be a reduction in the thickness along a portion of the second longitudinal stripe. For example, thickness may be reduced by forming a grove in the second longitudinal stripe. When a series of perforations is used to provide a line of weakness, the length and spacing of the perforations may be selected to provide a stable roll that can be unwound reliably when desired. In some embodiments, the length of the perforations may be less than 15 (in some embodiments, up to 14, 13, 12, 11, or 10) mm. Furthermore, the composition of the second polymeric composition can be adjusted so that the longitudinal second stripes can be reliably perforated. For example, the present inventors have found that longitudinal second stripes formed from a material that is too soft are difficult to reliably perforate and that it is advantageous to include an inelastic polymer with the elastomeric polymer in the second polymeric composition (see above).

In some embodiments of article 80, the film comprises opposing major surfaces, and at least one of the opposing major surfaces is provided with projections. Extruded article 80 may be useful, for example, in the manufacture of fastening tabs (e.g., for disposable absorbent articles such as pant-style diapers, open-style diapers, and incontinence garments). The roll can be unwound while the longitudinal stripes 88, 86 are separated along the lines of weakness 85 in the second longitudinal stripes 86 to provide an individual first longitudinal stripe 89 that has a second longitudinal stripe 86 along each of its lateral edges. The so-formed stripe can be cut in the cross-direction to provide an individual fastening tab that has a central region comprising the inelastic first polymeric composition and edges comprising the second polymeric composition comprising an elastomeric polymer. A fastening tab with edges comprising an elastomeric polymer may be softer to the touch and less irritating to the skin when applying or wearing a disposable absorbent article.

Figure 8:
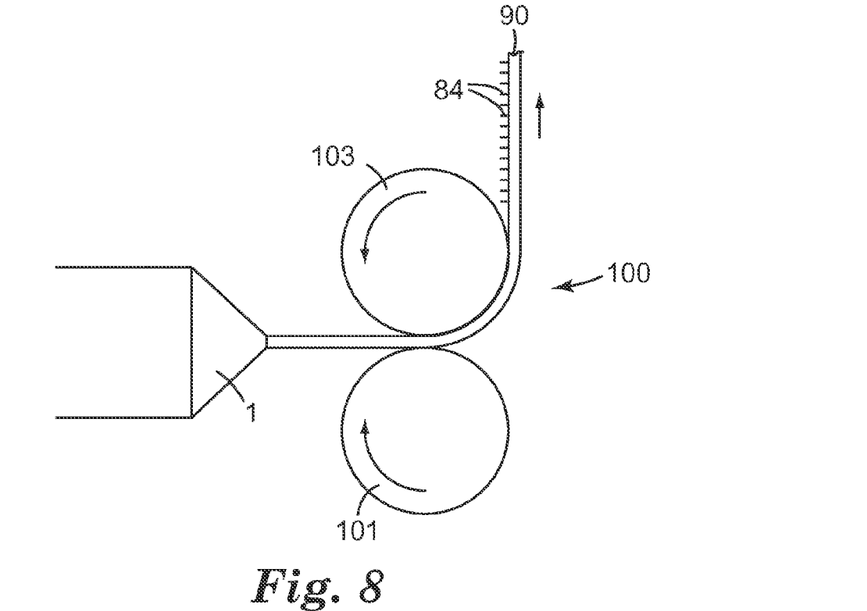
FIG. 8 is a schematic view of an apparatus and method according to some embodiments, where at least one of the stripes of the extruded article is provided with projections.

In embodiments of this disclosure in which projections are provided on the extruded article, the projections can be made on at least one or more of the longitudinal first stripes, on at least one or more of the longitudinal second stripes, or both. In some embodiments, projections are provided on both the longitudinal first stripes and the longitudinal second stripes. The projections provided on at least some of the longitudinal stripes can be formed using methods known in the art. For example, an extruded article, upon exiting the die disclosed herein, can be fed onto a continuously moving mold surface with cavities having the inverse shape of the projections. The cavities may be in the shape of projection having a loop-engaging head or may be in the shape of a precursor to a hook element (e.g., a partially formed hook element). In some embodiments, the projections (e.g., hooks, stems, or ribs) are formed as schematically shown in FIG. 8. Extruded article 90 after leaving the die 1 is passed between a nip formed by two rolls 101, 103. Alternatively the extruded article could be nipped, for example, between a die face and roll surface. At least one of the rolls 103 has cavities (not shown) in the inverse form of projections. Pressure provided by the nip forces the resin into the cavities. In some embodiments, a vacuum can be used to evacuate the cavities for easier filling of the cavities. The nip is sufficiently wide such that a coherent film backing 90 is also formed over the cavities. The mold surface and cavities can be air or water cooled (e.g., by air or water) before stripping the integrally formed backing and upstanding formed stems from the mold surface such as by a stripper roll. This provides an extruded film 90 having integrally formed upstanding stems or hooks 84. In some embodiments, the extruded article that is provided with projections has at least one co-extruded layer. For example, a co-extruded skin layer of an inelastic material may be useful for facilitating the stripping of the formed stems from the mold surface.

If the projections formed upon exiting the cavities described above in connection with FIG. 8 do not have loop-engaging heads, the projections formed could be subsequently formed into hooks by a capping method as described in U.S. Pat. No. 5,077,870 (Melbye et al.), the disclosure of which is incorporated herein by reference in its entirety. Typically, the capping method includes deforming the tip portions of projections 84 using heat and/or pressure. The heat and pressure, if both are used, could be applied sequentially or simultaneously.

Another useful method for providing projections on at least some of the longitudinal stripes of the extruded article disclosed herein is described, for example, in U.S. Pat. No. 4,894,060 (Nestegard), which discloses a method of preparing profile extruded hooks and is incorporated herein by reference in its entirety. Typically, these projections are formed by passing a polymeric flow stream through a patterned die lip (e.g., cut by electron discharge machining) to form a web having downweb ridges, slicing the ridges, and stretching the web to form separated projections. The ribs may form hook precursors and exhibit the cross-sectional shape of functional hooks to be formed. The ribs of the thermoplastic web layer are then transversely cut or slit at spaced locations along the extension of the rib to form discrete portions of the rib having lengths in the direction of the rib essentially corresponding to the length of the projections to be formed.

Figure 7A:
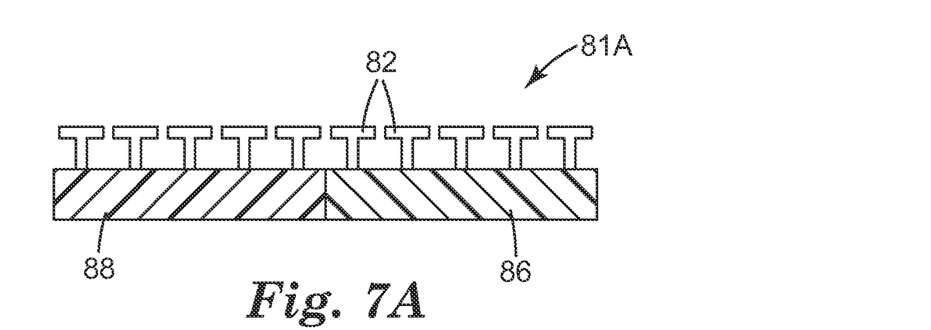
FIG. 7A is a perspective cross-sectional view of an embodiment of an extruded article where each of the longitudinal stripes is provided with projections having loop-engaging heads.
Figure 7B:
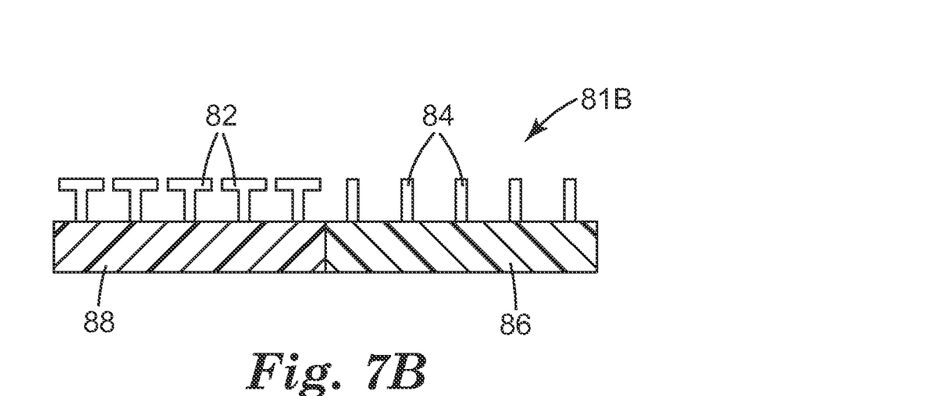
FIG. 7B is a perspective cross-sectional view of an embodiment of an extruded article where one of the longitudinal stripes is provided with projections having loop-engaging heads, and one of the longitudinal stripes is provided with projections without loop-engaging heads.

Extruded articles (e.g., films) according to and/or made according to the present disclosure may comprise projections on at least one of the first longitudinal stripes or the second longitudinal stripes and on at least one of the opposing major surfaces of the film. In some of these embodiments, the extruded article may be useful in a hook-and-loop fastening system, for example, as a hook strip. In some embodiments, the projections (e.g., hooks, stems, or ribs) are provided on a longitudinal first stripe. In some embodiments, both the longitudinal first and second stripes are provided with projections. In some embodiments, the longitudinal second stripes are free of projections. FIG. 7A illustrates an exemplary extruded article 81A (e.g., an extruded film) where longitudinal first and second stripes 88, 86 are each provided with projections having loop-engaging heads 82. FIG. 7B illustrates an exemplary extruded article 81B (e.g., an extruded film) where projections on the longitudinal first stripes 88 comprise loop-engaging heads 82, and where projections on the longitudinal second stripes 86 comprise stems without loop-engaging heads 84. In the illustrated embodiment, projections 82 and 84 have substantially the same height, which may be useful, for example, for uniform handling of an extruded article disclosed herein in the form of a web or a roll. Having projections with the substantially the same height in the longitudinal first and second stripes may also be desirable, for example, for appearance or feel. The height of the projections can be controlled by controlling the film height by adjusting, for example, the composition of the second polymeric composition as described above. If a capping process is used to form loop-engaging heads on projections on both the longitudinal first and second stripes, the composition of the second polymeric composition can be adjusted, for example, to make the heights of the projections on the longitudinal first and second stripes substantially the same before the capping process. If a capping process is used to form loop-engaging heads on projections on only one of the longitudinal first or second stripes (e.g., the longitudinal first stripes), the composition of the second polymeric composition can be adjusted, for example, to make the heights of the projections on the longitudinal second stripes shorter than the projections on the longitudinal first stripes so that after the capping process, the heights of the projections on the longitudinal first and second stripes is substantially the same.

The method and die described herein can be used to make a variety of films or filmlike articles as well as other co-extruded articles (e.g., privacy film, light film, or co-extruded tubing).

SELECTED EMBODIMENTS OF THE DISCLOSURE

In a first embodiment, the present disclosure provides a die for co-extruding at least a first extrudable polymeric composition and a second extrudable polymeric composition, the die comprising:
a first die cavity in a first die portion;
a second die cavity in a second die portion; and
a distribution plate interposed between at least a portion of the first die cavity and at least a portion of the second die cavity, the distribution plate having a first side forming a boundary of the first die cavity, an opposing second side forming a boundary of the second die cavity, a dispensing edge, a plurality of first extrusion channels, and a plurality of second extrusion channels, with the plurality of first extrusion channels extending from entrance openings at the first die cavity to exit openings on the dispensing edge, the plurality of second extrusion channels extending from entrance openings at the second die cavity to exit openings on the dispensing edge, with the exit openings of the plurality of first extrusion channels and the exit openings of the plurality of second extrusion channels being disposed in alternating positions along the dispensing edge, wherein each of the first extrusion channels comprises two opposite side walls and a joining surface connecting the two opposite side walls, and wherein the joining surface of at least some of the first extrusion channels is substantially parallel to the first side of the distribution plate.

In a second embodiment, the present disclosure provides the die according to the first embodiment, wherein each of the first extrusion channels further comprises a rear wall opposite the exit opening and connecting the two opposite side walls, the rear wall being substantially perpendicular to the first side of the distribution plate.

In a third embodiment, the present disclosure provides the die according to the first or second embodiment, wherein each of the exit openings of the first and second extrusion channels has a minimum width of greater than 1.5 millimeters.

In an fourth embodiment, the present disclosure provides the die according to any one of the first to third embodiments, wherein at least some of the first extrusion channels each comprise a reinforcing member.

In a fifth embodiment, the present disclosure provides the die according to any one of the first to fourth embodiments, wherein the two opposite side walls of the first extrusion channels are substantially perpendicular to the first side of the distribution plate.

In a sixth embodiment, the present disclosure provides the die according to any one of the first to fifth embodiments, wherein the exit openings of the first extrusion channels extend from the first side of the distribution plate toward but not all the way to the second side of the distribution plate, and wherein the exit openings of the second extrusion channels extend from the second side of the distribution plate toward but not all the way to the first side of the distribution plate such that a zone of overlap between the exit openings of the first extrusion channels and the exit openings of the second extrusion channels is formed.

In a seventh embodiment, the present disclosure provides the die according to any of the first to fifth embodiments, wherein the exit openings of the first extrusion channels extend from the first side of the distribution plate to a middle portion between the first side and the second side of the distribution plate, and wherein the exit openings of the second extrusion channels extend from the second side of the distribution plate to the middle portion such that the exit openings of the first extrusion channels and the exit openings of the second extrusion channels do not overlap.

In an eighth embodiment, the present disclosure provides the die according to any of the first to seventh embodiments, wherein the distribution plate is at least 5 millimeters thick.

In a ninth embodiment, the present disclosure provides the die according to any of the first to eighth embodiments, wherein the die further comprises a die lip within 2.5 cm from the dispensing edge.

In a tenth embodiment, the present disclosure provides the die according to any of the first to ninth embodiments, wherein the first extrusion channels and second extrusion channels have unequal widths.

In an eleventh embodiment, the present disclosure provides the die according to any of the first to tenth embodiments, wherein the first extrusion channels and second extrusion channels have unequal depths.

In a twelfth embodiment, the present disclosure provides a method of making an extruded article, the method comprising:
providing the die according to any one of the first to eleventh embodiments;
supplying a first polymeric composition into the first die cavity;
supplying a second polymeric composition, different from the first polymeric composition, into the second die cavity;
extruding the first polymeric composition through the plurality of first extrusion channels and the second polymeric composition through the plurality of second extrusion channels so as to form a flow stream having a width with alternating zones of the first and second polymeric compositions; and
extruding the flow stream out of the die in a longitudinal direction so as to form the extruded article comprising a plurality of longitudinal first stripes of the first polymeric composition alternating with a plurality of longitudinal second stripes of the second polymeric composition, wherein at least some of the longitudinal first stripes have, in a plane perpendicular to the longitudinal direction, a cross-sectional shape comprising substantially parallel opposite sides.

In a thirteenth embodiment, the present disclosure provides the method according to the twelfth embodiment, wherein at least one of the longitudinal first stripes is integrally joined with at least one of the longitudinal second stripes.

In a fourteenth embodiment, the present disclosure provides the method according to any of the twelfth to thirteenth embodiments, wherein the first polymeric composition comprises an inelastic polymer.

In a fifteenth embodiment, the present disclosure provides the method according to any of the twelfth to fourteenth embodiments, wherein the second polymeric composition comprises an elastomeric polymer.

In a sixteenth embodiment, the present disclosure provides the method according to the fifteenth embodiment, wherein the second polymeric composition further comprises an inelastic polymer.

In a seventeenth embodiment, the present disclosure provides the method according to any one of the twelfth to sixteenth embodiments, wherein at least one of the longitudinal first stripes has a width unequal to the width of an adjacent longitudinal second stripe.

In an eighteenth embodiment, the present disclosure provides the method according to any one of the twelfth to seventeenth embodiments, wherein at least one of the first or second polymeric compositions is foamed.

In a nineteenth embodiment, the present disclosure provides the method according to any one of the twelfth to eighteenth embodiments, wherein the extruded article has opposing major surfaces, the method further comprising co-extruding a third polymeric composition to form a layer on at least one of the opposing major surfaces of the extruded article.

In a twentieth embodiment, the present disclosure provides the method according to the nineteenth embodiment, wherein the third polymeric composition is different from both the first polymeric composition and the second polymeric composition.

In a twenty-first embodiment, the present disclosure provides the method according to any one of the twelfth to eighteenth embodiments, wherein the extruded article has opposing major surfaces, the method further comprising co-extruding a third polymeric composition to form a layer on one of the opposing major surfaces of the extruded article and a fourth polymeric composition on the other of the opposing major surfaces of the extruded article, wherein the first, second, third, and fourth polymeric compositions are each different from each other.

In a twenty-second embodiment, the present disclosure provides the method according to any one of the twelfth to twenty-first embodiments, wherein the extruded article has opposing major surfaces, the method further comprising providing projections on at least one of the opposing major surfaces.

In a twenty-third embodiment, the present disclosure provides the method according to the twenty-second embodiment, wherein providing projections comprises contacting at least one of the major surfaces of the extruded article with at least one of a patterned roll, patterned belt, or patterned film.

In a twenty-fourth embodiment, the present disclosure provides the method according to any one of the twenty-second to twenty-third embodiments, wherein the projections are provided on at least some of the longitudinal first stripes, and wherein the projections comprise loop-engaging heads.

In a twenty-fifth embodiment, the present disclosure provides the method according to any one of the twenty-second to twenty-fourth embodiments, wherein the projections are provided on at least some of the longitudinal second stripes and comprise stems without loop-engaging heads.

In a twenty-sixth embodiment, the present disclosure provides the method according to any one of the twenty-second to twenty-fifth embodiments, wherein both the plurality of longitudinal first stripes and the plurality of longitudinal second stripes are provided with projections, the projections of the plurality of longitudinal first stripes being substantially the same height as the projections of the plurality of longitudinal second stripes.

In a twenty-seventh embodiment, the present disclosure provides the method according to any one of the twelfth to twenty-sixth embodiments, wherein the extruded article is formed into a roll.

In a twenty-eighth embodiment, the present disclosure provides the method according to any one of the twelfth to twenty-seventh embodiments, wherein at least some of longitudinal second stripes have lines of weakness along their lengths.

In a twenty-ninth embodiment, the present disclosure provides an extruded film having first and second lateral edges and a midline, the extruded film comprising an even number of longitudinal first stripes of a first polymeric composition comprising an inelastic polymer alternating with an odd number of longitudinal second stripes of a second polymeric composition comprising an elastomeric polymer such that the longitudinal second stripes are located at least at the first and second lateral edges and at the midline, and wherein at least some of longitudinal second stripes have lines of weakness along their lengths. In some of these embodiments, each of the longitudinal second stripes not located at the first or second lateral edges has a line of weakness along its length.

In a thirtieth embodiment, the present disclosure provides an extruded film according to the twenty-ninth embodiment, wherein the second polymeric composition further comprises an inelastic polymer.

In a thirty-first embodiment, the present disclosure provides an extruded film according to the twenty-ninth or thirtieth embodiment, wherein the extruded film comprises opposing major surfaces, and at least one of the opposing major surfaces is provided with projections.

In a thirty-second embodiment, the present disclosure provides an extruded film according to any one of the twenty-ninth to thirty-first embodiments, wherein at least one of the longitudinal first stripes has a width unequal to the width of an adjacent longitudinal second stripe.

In a thirty-third embodiment, the present disclosure provides an extruded film according to any one of the twenty-ninth to thirty-second embodiments, wherein the extruded film is in the form of a roll.

In a thirty-fourth embodiment, the present disclosure provides an extruded film according to any one of the twenty-ninth to thirty-third embodiments, wherein both the longitudinal first stripes and the longitudinal second stripes are provided with projections on at least one of the opposing major surfaces, the projections of the longitudinal first stripes being substantially the same height as the projections of the longitudinal second stripes.

In a thirty-fifth embodiment, the present disclosure provides an extruded film having opposing major surfaces and comprising a plurality of longitudinal first stripes of a first polymeric composition comprising an inelastic polymer alternating with a plurality of longitudinal second stripes of a second polymeric composition comprising a blend of an elastomeric polymer and an inelastic polymer, wherein both the plurality of longitudinal first stripes and the plurality of longitudinal second stripes are provided with projections on at least one of the opposing major surfaces, the projections of the plurality of longitudinal first stripes being substantially the same height as the projections of the plurality of longitudinal second stripes.

In a thirty-sixth embodiment, the present disclosure provides an extruded film according to the thirty-fourth or thirty-fifth embodiment, wherein the projections provided on the longitudinal first stripes comprise loop-engaging heads.

In a thirty-seventh embodiment, the present disclosure provides an extruded film according to any one of the thirty-fourth to thirty-sixth embodiments, wherein the projections provided on the longitudinal second stripes comprise stems without loop-engaging heads.

In a thirty-eighth embodiment, the present disclosure provides an extruded film according to any one of the thirty-fourth to thirty-seventh embodiments, wherein the projections comprise loop-engaging heads.

In a thirty-ninth embodiment, the present disclosure provides an extruded film according to any one of the twenty-ninth to thirty-eighth embodiments, wherein the extruded film is in the form of a roll.

EXAMPLES

Several non-limiting examples were prepared to demonstrate the apparatus and method for making the extruded article. For each of them, a coextrusion die was assembled generally as depicted in FIG. 1. The first die portion 22 and a second die portion 24 were fabricated from 17-4 stainless steel generally as depicted in FIG. 2. For Example 1, a distribution plate 26 was prepared from 40 mils (1 mm) thick precision ground stainless steel sheet, generally as depicted in FIGS. 3 and 4. For Examples 2 to 8, the distribution plate 26 was prepared from 80 mils (2 mm) thick precision ground stainless steel. The distribution plate 26 was machined to provide a first and a second plurality of extrusion channels 50 and 52, generally as depicted in FIG. 4. This machining was done using a high-speed computer numerical control milling machine. The extrusion channels 50 and 52 were cut into the dispensing edge 36 of the distribution plate 26. The dimensions of the channels are shown in Tables 1 and 3, below, with the depth referring to the thickness of the dispensing edge. The extrusion channels 50 and 52 were 28 mm in length (from the dispensing edge 36 to the rear wall 55). The entrance openings of extrusion channels 50 were formed with reinforcing ribs 59 that extended 24 mm from the rear wall 55 toward the dispensing edge 36. The extrusion channels were prepared with a repeat across the dispensing edge in an alternating pattern at a spacing of the width of the Polymer A channels plus the width of the Polymer B channels, as given in Tables 1 and 3, below. The full width of die lip 44 was 8 inches (20 cm).

Examples 1-4

In each of the Examples 1-4 below, the first material inlet (introducing Polymer A from Table 1 below into the extrusion die) was fed with a melt train focused around a 40 mm twin screw extruder. The second material inlet (introducing Polymer B from Tables 1 below into the extrusion die) was fed with a melt train focused around a 50 mm single screw extruder. The extrusion barrel temperatures used ranged from 100-230° C., with the lowest temperatures corresponding to the inlet section. The metering section of the extruder was maintained at 230° C. The die temperature was 230° C. for both manifold sides. Total mass output from the process ranged from 15 to 20 kg/hr. Example 1 was run at a 5 kg/hr mass output and at slower line speed. During the co-extrusion runs, the die was positioned adjacent to a chilled roller so that the coextruded film was quenched while being taken away on the chilled roller. Down web, the coextruded film was wound up into a roll. The mass ratio of major channel Polymer A to minor channel Polymer B was varied to achieve the targeted parallel lane dimensions. The major channel Polymer A was a film grade polypropylene (PP) copolymer, a polypropylene impact copolymer obtained from Dow Chemical Co., Midland, Mich., under the trade designation "DOW C700-35N POLYPROPYLENE" that was pigmented blue. The minor channel Polymer B was a polyolefin thermoplastic elastomer or polyolefin thermoplastic elastomer and polyolefin blend. In Table 1, TPE is an ethylene-octene copolymer obtained from Dow Chemical Co. under the trade designation "ENGAGE 8200 POLYOLEFIN ELASTOMER", and LDPE is a low density polyethylene obtained from ExxonMobil Chemical Co., Houston, Tex., under the trade designation "EXXON MOBIL LD 123.LN". Materials and extrusion temperatures and conditions for Examples 1 to 4 were as shown in Table 1, below.

TABLE 1

|  | Example 1 | Example 2 | Example 3 | Example 4 |
|---|---|---|---|---|
| Polymer A | PP copolymer | PP copolymer | PP copolymer | PP copolymer |
| Polymer B | TPE | TPE & PP copolymer blend (ratio = 40/60) | TPE & PP copolymer blend (ratio = 50/50) | TPE & LDPE blend (ratio = 50/50) |
| Polymer A Extruder Barrel Temps | 100-230° C. | 100-230° C. | 100-230° C. | 100-230° C. |
| Polymer B Extruder Barrel Temps | 100-230° C. | 100-230° C. | 100-230° C. | 100-230° C. |
| Die Temperature | 230° C. | 230° C. | 230° C. | 230° C. |
| Die Channel Ratio | 2/1 | 8/1 | 8/1 | 8/1 |
| Polymer A Channel Dimensions (width × depth) | 20.0 mm × 0.5 mm | 20.0 mm × 0.5 mm | 20.0 mm × 0.5 mm | 16.0 mm × 0.5 mm |
| Polymer B Channel Dimensions (width × depth) | 10.0 mm × 0.5 mm | 2.5 mm × 0.5 mm | 2.5 mm × 0.5 mm | 2.0 mm × 0.5 mm |
| Takeaway Speed | 3 m/min | 20 m/min | 20 m/min | 20 m/min |

Examples 1 to 4 resulted in coextruded films with alternating stripes of pigmented Polymer A and stripes of clear Polymer B in the cross direction of the film. Lane width dimensions and film basis weights are provided in Table 2, below.

TABLE 2

| Example | Film Basis Weight (g/m$^2$) | Polymer A Lane Width (mm) | Polymer B Lane Width (mm) |
|---|---|---|---|
| Example 1 | 124 | 20 | 9 |
| Example 2 | 100 | 20 | 2 |
| Example 3 | 110 | 18 | 4 |
| Example 4 | 94 | 13 | 4 |

Examples 5-8

Examples 5-8 were prepared as described above for Examples 1-4 with the following modifications. The lane backing thicknesses were changed by varying the ratio of TPE and PP and holding the other process conditions constant. Materials and extrusion temperatures and conditions for Examples 5-8 were as shown in Table 3, below.

TABLE 3

|  | Example 5 | Example 6 | Example 7 | Example 8 |
|---|---|---|---|---|
| Polymer A | PP copolymer | PP copolymer | PP copolymer | PP copolymer |
| Polymer B | TPE & PP copolymer blend (ratio = 100/0) | TPE & PP copolymer blend (ratio = 85/15) | TPE & PP copolymer blend (ratio = 75/25) | TPE & PP copolymer blend (ratio = 50/50) |
| Polymer A Extruder Barrel temps | 100-230° C. | 100-230° C. | 100-230° C. | 100-230° C. |
| Polymer B Extruder Barrel temps | 100-230° C. | 100-230° C. | 100-230° C. | 100-230° C. |
| Die Temperature | 230° C. | 230° C. | 230° C. | 230° C. |
| Die channel ratio | 8/1 | 8/1 | 8/1 | 8/1 |
| Polymer A Channel Dimensions (width × height) | 20.0 mm × 0.5 mm | 20.0 mm × 0.5 mm | 20.0 mm × 0.5 mm | 16.0 mm × 0.5 mm |
| Polymer B Channel Dimensions (width × height) | 2.5 mm × 0.5 mm | 2.5 mm × 0.5 mm | 2.5 mm × 0.5 mm | 2.0 mm × 0.5 mm |
| Takeaway Speed | 20 m/min | 20 m/min | 20 m/min | 20 m/min |

Examples 5-8 resulted in coextruded films with alternating stripes of pigmented Polymer A and stripes of clear Polymer B in the cross direction of the film. The lane thickness dimensions are provided shown in Table 4. The Polymer A lane width was 13 mm, and the Polymer B lane width was 4 mm for each of Examples 5-8.

TABLE 4

| Example | Polymer A Lane Film Thickness (µm) | Polymer B Lane Film Thickness (µm) |
|---|---|---|
| Example 5 | 130 | 100 |
| Example 6 | 120 | 100 |
| Example 7 | 125 | 135 |
| Example 8 | 115 | 180 |

Examples 9 and 10

Examples 9 and 10 were prepared as described above for Examples 2 and 4, except that projections were provided on one surface of the extruded film article. The projections were formed as shown and described for FIG. 8. The extruded film article, upon exiting the die, was passed between a nip formed by two rolls, with one of the rolls having cavities in the shape of the projections. This provided a segmented multicomponent polymer film having integrally formed upstanding stems on one surface. The stems were subsequently formed into hooks by a capping method, as described in U.S. Pat. No. 5,077,870 (Melbye et al.), col. 5, lines 50-60. Examples 9 to 10 were each formed with a 1600 hooks per square inch array with a total height of 360 µm, a backing film thickness of 100 µm, and with hook head of 300-330 µm diameter.

This disclosure may take on various modifications and alterations without departing from its spirit and scope. Accordingly, this disclosure is not limited to the above-described embodiments but is to be controlled by the limitations set forth in the following claims and any equivalents thereof. This disclosure may be suitably practiced in the absence of any element not specifically disclosed herein. All patents and patent applications cited above, including those in the Background section, are hereby incorporated by reference into this document in their entirety.

What is claimed is:

1. A die for co-extruding at least a first extrudable polymeric composition and a second extrudable polymeric composition, the die comprising:
   a first die cavity in a first die portion;
   a second die cavity in a second die portion; and
   a distribution plate interposed between at least a portion of the first die cavity and at least a portion of the second die cavity, the distribution plate having a first side forming a boundary of the first die cavity, an opposing second side forming a boundary of the second die cavity, a dispensing edge, a plurality of first extrusion channels, and a plurality of second extrusion channels, with the plurality of first extrusion channels extending from entrance openings at the first die cavity to exit openings on the dispensing edge, the plurality of second extrusion channels extending from entrance openings at the second die cavity to exit openings on the dispensing edge, with the exit openings of the plurality of first extrusion channels and the exit openings of the plurality of second extrusion channels being disposed in alternating positions along the dispensing edge, wherein each of the first extrusion channels comprises two opposite side walls and a joining surface connecting the two opposite side walls, wherein the joining surface of at least some of the first extrusion channels is substantially parallel to the first side of the distribution plate, and wherein each of the first extrusion channels further comprises a rear wall opposite the exit opening and connecting the two opposite side walls, the rear wall being substantially perpendicular to the first side of the distribution plate.

2. The die according to claim 1, wherein at least some of the first extrusion channels each comprise a reinforcing member.

3. The die according to claim 1, wherein the two opposite side walls of the first extrusion channels are substantially perpendicular to the first side of the distribution plate.

4. The die according to claim 1, wherein the exit openings of the first extrusion channels extend from the first side of the distribution plate toward but not all the way to the second side of the distribution plate, and wherein the exit openings of the second extrusion channels extend from the second side of the distribution plate toward but not all the way to the first side of the distribution plate such that a zone of overlap between the exit openings of the first extrusion channels and the exit openings of the second extrusion channels is formed.

5. The die according to claim 1, wherein the exit openings of the first extrusion channels extend from the first side of the distribution plate to a middle portion between the first side and the second side of the distribution plate, and wherein the exit openings of the second extrusion channels extend from the second side of the distribution plate to the middle portion such that the exit openings of the first extrusion channels and the exit openings of the second extrusion channels do not overlap.

6. The die according to claim 1, wherein the die further comprises a die lip within 2.5 cm from the dispensing edge.

7. The die according to claim 1, wherein the first extrusion channels and second extrusion channels have unequal widths.

8. A method of making an extruded article, the method comprising:
providing the die according to claim 1;
supplying a first polymeric composition into the first die cavity;
supplying a second polymeric composition, different from the first polymeric composition, into the second die cavity;
extruding the first polymeric composition through the plurality of first extrusion channels and the second polymeric composition through the plurality of second extrusion channels so as to form a flow stream having a width with alternating zones of the first and second polymeric compositions; and
extruding the flow stream out of the die in a longitudinal direction so as to form the extruded article comprising a plurality of longitudinal first stripes of the first polymeric composition alternating with a plurality of longitudinal second stripes of the second polymeric composition, wherein at least some of the longitudinal first stripes have, in a plane perpendicular to the longitudinal direction, a cross-sectional shape comprising substantially parallel opposite sides.

9. The method according to claim 8, wherein the first polymeric composition comprises an inelastic polymer, and wherein the second polymeric composition comprises an elastomeric polymer.

10. The method according to claim 9, wherein the second polymeric composition further comprises an inelastic polymer.

11. The method according to claim 8, wherein at least one of the first or second polymeric compositions is foamed.

12. The method according to claim 8, wherein the extruded article has opposing major surfaces, the method further comprising co-extruding a third polymeric composition to form a layer on at least one of the opposing major surfaces of the extruded article, wherein the third polymeric composition is different from both the first polymeric composition and the second polymeric composition.

13. The method according to claim 8, wherein the extruded article has opposing major surfaces, the method further comprising providing projections on at least one of the opposing major surfaces.

14. The method according to claim 13, wherein the projections are provided on at least some of the longitudinal first stripes, and wherein the projections comprise loop-engaging heads.

15. The method according to claim 13, wherein the projections are provided on at least some of the longitudinal second stripes and comprise stems without loop-engaging heads.

16. The method according to claim 13, wherein both the plurality of longitudinal first stripes and the plurality of longitudinal second stripes are provided with projections, the projections of the plurality of longitudinal first stripes being substantially the same height as the projections of the plurality of longitudinal second stripes.

17. The die according to claim 1, wherein each of the exit openings of the first and second extrusion channels has a minimum width of greater than 1.5 millimeters.

18. The die according to claim 1, wherein the first extrusion channels and second extrusion channels have unequal depths.

19. The method according to claim 8, wherein at least one of the longitudinal first stripes has a width unequal to the width of an adjacent longitudinal second stripe.

20. The method according to claim 8, wherein the extruded article is a film comprising an even number of the longitudinal first stripes of the first polymeric composition comprising an inelastic polymer alternating with an odd number of the longitudinal second stripes of the second polymeric composition comprising an elastomeric polymer such that the longitudinal second stripes are located at least at the first and second lateral edges and at the midline, and wherein at least some of longitudinal second stripes have lines of weakness along their lengths.

* * * * *